United States Patent
Buddhikot et al.

(10) Patent No.: US 10,944,875 B2
(45) Date of Patent: Mar. 9, 2021

(54) INTERFACE AGGREGATION FOR HETEROGENEOUS WIRELESS COMMUNICATION SYSTEMS

(71) Applicant: Alcatel-Lucent USA Inc., Murray Hill, NJ (US)

(72) Inventors: Milind M. Buddhikot, Bridgewater, NJ (US); Lance Hartung, Madison, WI (US)

(73) Assignee: ALCATEL-LUCENT USA INC., Murray Hill, NJ (US)

( * ) Notice: Subject to any disclaimer, the term of this patent is extended or adjusted under 35 U.S.C. 154(b) by 1564 days.

(21) Appl. No.: 14/606,360

(22) Filed: Jan. 27, 2015

(65) Prior Publication Data
US 2016/0219588 A1    Jul. 28, 2016

(51) Int. Cl.
| | |
|---|---|
| *H04M 15/00* | (2006.01) |
| *H04L 12/24* | (2006.01) |
| *H04W 28/24* | (2009.01) |
| *H04L 12/14* | (2006.01) |

(52) U.S. Cl.
CPC ........ *H04M 15/68* (2013.01); *H04L 41/0893* (2013.01); *H04L 41/0896* (2013.01); *H04L 41/5054* (2013.01); *H04L 12/1492* (2013.01); *H04M 15/66* (2013.01); *H04W 28/24* (2013.01)

(58) Field of Classification Search
CPC .......... H04L 29/06176; H04L 29/0617; H04M 15/68; H04W 28/24
USPC ......................................................... 370/329
See application file for complete search history.

(56) References Cited

U.S. PATENT DOCUMENTS

| | | | |
|---|---|---|---|
| 5,592,469 A | * | 1/1997 | Szabo ..................... H04B 7/24 370/342 |
| 6,282,581 B1 | | 8/2001 | Moore et al. |
| 8,340,633 B1 | | 12/2012 | Rege et al. |
| 8,514,701 B2 | | 8/2013 | Kalla et al. |
| 8,825,053 B2 | | 9/2014 | Sachs et al. |
| 8,848,640 B2 | | 9/2014 | Reznik et al. |
| 9,571,952 B2 | * | 2/2017 | Meylan ................. H04W 4/003 |
| 2006/0098620 A1 | | 5/2006 | Zhou et al. |
| 2008/0259841 A1 | | 10/2008 | Deshpande |

(Continued)

OTHER PUBLICATIONS

Non-Final Office Action dated Sep. 14, 2016 for U.S. Appl. No. 14/606,366, 27 pages.

(Continued)

*Primary Examiner* — Mark H Rinehart
*Assistant Examiner* — Kokou R Detse (57) ABSTRACT

First user equipment transmits information identifying first interfaces supported by the first user equipment and first channel capacities associated with the first interfaces. The first user equipment receives information identifying a subset of the first interfaces. The subset is selected based on the first channel capacities and second channel capacities of second interfaces associated with at least one second user equipment. The first user equipment is then configured to aggregate the subset of the first interfaces. A policy server selects a subset of first interfaces supported by a first user equipment based on information indicating first channel capacities of the first interfaces and second channel capacities of second interfaces associated with at least one second user equipment. The policy server transmits instructions to the first user equipment to aggregate the subset.

28 Claims, 5 Drawing Sheets

(56) References Cited

U.S. PATENT DOCUMENTS

| | | | |
|---|---|---|---|
| 2009/0029645 A1* | 1/2009 | Leroudier | H04B 7/2606 455/7 |
| 2009/0135966 A1 | 5/2009 | Fischer et al. | |
| 2009/0213825 A1 | 8/2009 | Gupta | |
| 2010/0113027 A1 | 5/2010 | Hsu | |
| 2010/0296437 A1* | 11/2010 | Stelle | H04L 45/125 370/328 |
| 2011/0222468 A1 | 9/2011 | Li | |
| 2011/0271002 A1 | 11/2011 | Martinez et al. | |
| 2013/0111038 A1 | 5/2013 | Girard | |
| 2014/0092828 A1* | 4/2014 | Sirotkin | H04W 72/0486 370/329 |
| 2014/0313989 A1 | 10/2014 | Doken et al. | |
| 2016/0286382 A1 | 9/2016 | Xu | |

OTHER PUBLICATIONS

Final Office Action dated May 12, 2016 for U.S. Appl. No. 14/606,366, 18 pages.
Final Office Action dated Nov. 28, 2016 for U.S. Appl. No. 14/606,366, 24 pages.
M. H. Masud et al., "A Scheduling Algorithm for Bandwidth Aggregation in Heterogeneous Wireless Network", 2014 International Conference on Informatics, Electronics & Vision (ICIEV), May 23, 2014, 4 pages.
U.S. Appl. No. 14/606,366, filed Jan. 27, 2015, entitled "Aggregated Wireline Backhaul for Wireless Modems".
International Search Report and Written Opinion correlating to PCT/US16/014656 dated Apr. 4, 2016, 13 pages.
Non-Final Office Action dated Jan. 5, 2016 for U.S. Appl. No. 14/606,366, 24 pages.

* cited by examiner

INTERFACE AGGREGATION FOR HETEROGENEOUS WIRELESS COMMUNICATION SYSTEMS

GOVERNMENT LICENSE RIGHTS

This invention was made with Government support under Contract Number NSF-CNS-1117597 awarded by the U.S. National Science Foundation. The Government has certain rights in this invention.

CROSS REFERENCE TO RELATED APPLICATIONS

This application is related to U.S. patent application Ser. No. 14/606,366, entitled "Aggregated Wireline Backhaul for Wireless Modems" and filed on even date herewith, the entirety of which is incorporated by reference herein.

BACKGROUND

Field of the Disclosure

The present disclosure relates generally to wireless communication systems and, more particularly, to heterogeneous wireless communication systems.

Description of the Related Art

Heterogeneous wireless communication systems implement a variety of macrocells and small cells to provide wireless connectivity to user equipment. The macrocells may also be referred to as base stations, base station routers, access points, and the like. The small cells may also be referred to as microcells, metrocells, picocells, femtocells, home base station routers, and the like. The coverage areas of small cells typically overlap with the coverage areas of the macrocells. The small cells can share the same channels as the overlaying macrocells, but in this case the small cells must be deployed outside of an exclusion zone around the macrocell to prevent excessive intercellular interference. The total traffic capacity and traffic offloaded to the small cells may therefore be limited. Future deployments may dedicate a portion of the spectrum to carrier channels for the small cells to reduce or eliminate constraints on deployments and capacity scaling. For example, reducing or eliminating deployment constraints such as those imposed by the exclusion zone can increase the number of deployed small cells and reduce the cell size served by each small cell, which correspondingly increases the area spectral efficiency (measured in bits per second per hertz per square meter) of the heterogeneous wireless communication system.

The small cells or macrocells can support multiple wireless communication interfaces. Small cells may support wireless communication in licensed frequency bands using frequency division duplexing (FDD) or time division duplexing (TDD) according to third-generation (3G) or fourth-generation (4G) wireless communication standards such as the Long Term Evolution (LTE) standards defined by the Third Generation Partnership Project (3GPP). Licensed frequency bands are licensed to a particular service provider and may only be used for wireless communication that is authorized by the service provider. Small cells may also support wireless communication in unlicensed frequency bands that include portions of the radio frequency spectrum that do not require a license for use and may therefore be used by any device to transmit or receive radio frequency signals. For example, the Unlicensed National Information Infrastructure (UNII) spectrum band includes frequency bands in the range of 5.15 gigahertz (GHz) to 5.825 GHz. For another example, the industrial, scientific, and medical (ISM) radio bands are portions of the radio spectrum that are reserved internationally for unlicensed communication. The ISM radio bands include bands with a center frequency of 2.4 GHz and a bandwidth of 100 megahertz (MHz), a center frequency of 5.8 GHz and a bandwidth of 150 MHz, and a center frequency of 24.125 GHz and a bandwidth of 250 MHz, among other frequency bands. Small cells may also provide wireless communication in shared frequency bands such as the 3.5 GHz Navy radar band used in the United States, the 470-700 MHz digital television band used in many parts of the world, and the 2.3 GHz band used in Europe.

User equipment such as cellular phones, smart phones, tablets, or laptops may support multiple radio interfaces between the user equipment and macrocells or small cells. For example, user equipment may implement cellular interfaces capable of operation in 3G bands according to code division multiple access (CDMA, W-CDMA) protocols or 4G bands according to FDD or TDD protocols defined by the LTE standards. User equipment may also implement one or more Wi-Fi interfaces capable of operation in 2.4 GHz unlicensed bands or 5 GHz unlicensed bands according to the 802.11 standards defined by the Institute of Electrical and Electronics Engineers (IEEE). Conventional user equipment use the multiple interfaces in an "either-or" configuration so that only one interface is activated at any given time. Consequently, the throughput for uplink or downlink communication between the user equipment and the heterogeneous wireless communication system is limited to the capacity supported by the individual interfaces, which is typically less than or on the order of tens of megabits per second (Mbps).

SUMMARY OF EMBODIMENTS

The following presents a summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In some embodiments, a method is provided for interface aggregation. The method includes transmitting, from first user equipment, information identifying first interfaces supported by the first user equipment and first channel capacities associated with the first interfaces. The method also includes receiving, at the first user equipment, information identifying a subset of the first interfaces. The subset is selected based on the first channel capacities and second channel capacities of second interfaces associated with at least one second user equipment. The method further includes configuring the first user equipment to aggregate the subset of the first interfaces.

In some embodiments, a method is provided for selecting bands for interface aggregation. The method includes selecting, at a policy server, a subset of first interfaces supported by a first user equipment based on information indicating first channel capacities of the first interfaces and second channel capacities of second interfaces associated with at least one second user equipment. The method also includes transmitting, from the policy server to the first user equipment, instructions to aggregate the subset.

In some embodiments, user equipment is provided that is able to perform interface aggregation. The user equipment includes a plurality of first interfaces, a transceiver, and a processor. The transceiver is to transmit information identifying the first interfaces and first channel capacities associated with the first interfaces and receive information identifying a subset of the first interfaces. The subset is selected based on the first channel capacities and second channel capacities of second interfaces associated with at least one other user equipment. The processor is to aggregate the subset of the first interfaces.

In some embodiments, an apparatus is provided to select bands for interface aggregation. The apparatus includes a processor to select a subset of first interfaces supported by a first user equipment based on information indicating first channel capacities of the first interfaces and second channel capacities of second interfaces associated with at least one second user equipment. The apparatus also includes a transceiver to transmit instructions to aggregate the subset at the first user equipment.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

The aggregate bandwidth of a heterogeneous wireless communication system may be increased by instructing a user equipment to aggregate a subset of a plurality of interfaces based on channel capacities of the plurality of interfaces and one or more channel capacities of one or more other interfaces implemented by other user equipment. The subset of the plurality of interfaces may be selected for the user equipment at the network layer (Layer 3) or transport layer (Layer 4) by a network-resident policy server using registration information provided by the user equipment. Some embodiments of the policy server may select a subset of the plurality of interfaces that have relative delays or latencies that are less than a threshold value. The policy server may determine the delays or latencies for each path based on performance measurements and conveyed to the network by the user equipment. The subset of the plurality of interfaces may also be selected based upon user equipment subscription, location, priority, class, or other user equipment performance measurements such as instantaneous or time-averaged values of the received signal strength, transmission rates, or loss rates. User input may be used to negotiate or confirm aggregation of the subset, e.g., in the event that one or more of the plurality of interfaces requires additional payment.

A dedicated bidirectional signaling channel may be established between the policy server and a policy agent in the user equipment. The dedicated bidirectional signaling channel may be used to indicate the subset of the plurality of interfaces to the user equipment, applications that are allowed to use the aggregated subset, prices or costs associated with the subset, or to request periodic performance measurements from the user equipment. The dedicated bidirectional signaling channel may also be used to convey a registration message including descriptions of capabilities of the plurality of interfaces or results of performance measurements performed by the user equipment.

As used herein, the term "aggregate" is understood to refer to the concurrent use of multiple interfaces to support sub-flows of a flow associated with the aggregated interfaces. The bandwidth available to the flow may be substantially equal to the sum of the bandwidths of the sub-flows supported by the aggregated interfaces. Service providers or applications may therefore provide flows using the increased bandwidth provided by the sub-flows of the aggregated interfaces. For example, user equipment that accesses a flow provided by a multimedia service provider such as Netflix or Hulu through a single Wi-Fi interface may be limited to a bandwidth such as the 20 MHz bandwidth of a standard Wi-Fi carrier channel, or in some cases an enhanced 80 MHz or 160 MHz channel. In contrast, the bandwidth available to user equipment that accesses a flow formed of the sub-flows of several aggregated interfaces may be equal to or greater than 1000 MHz. Aggregating the sub-flows of multiple interfaces may therefore provide multi-gigabit per second wireless access capacity or user throughputs of hundreds of megabits per second. Aggregation of interfaces may include adding or removing interfaces from the subset of aggregated interfaces.

Figure 1:
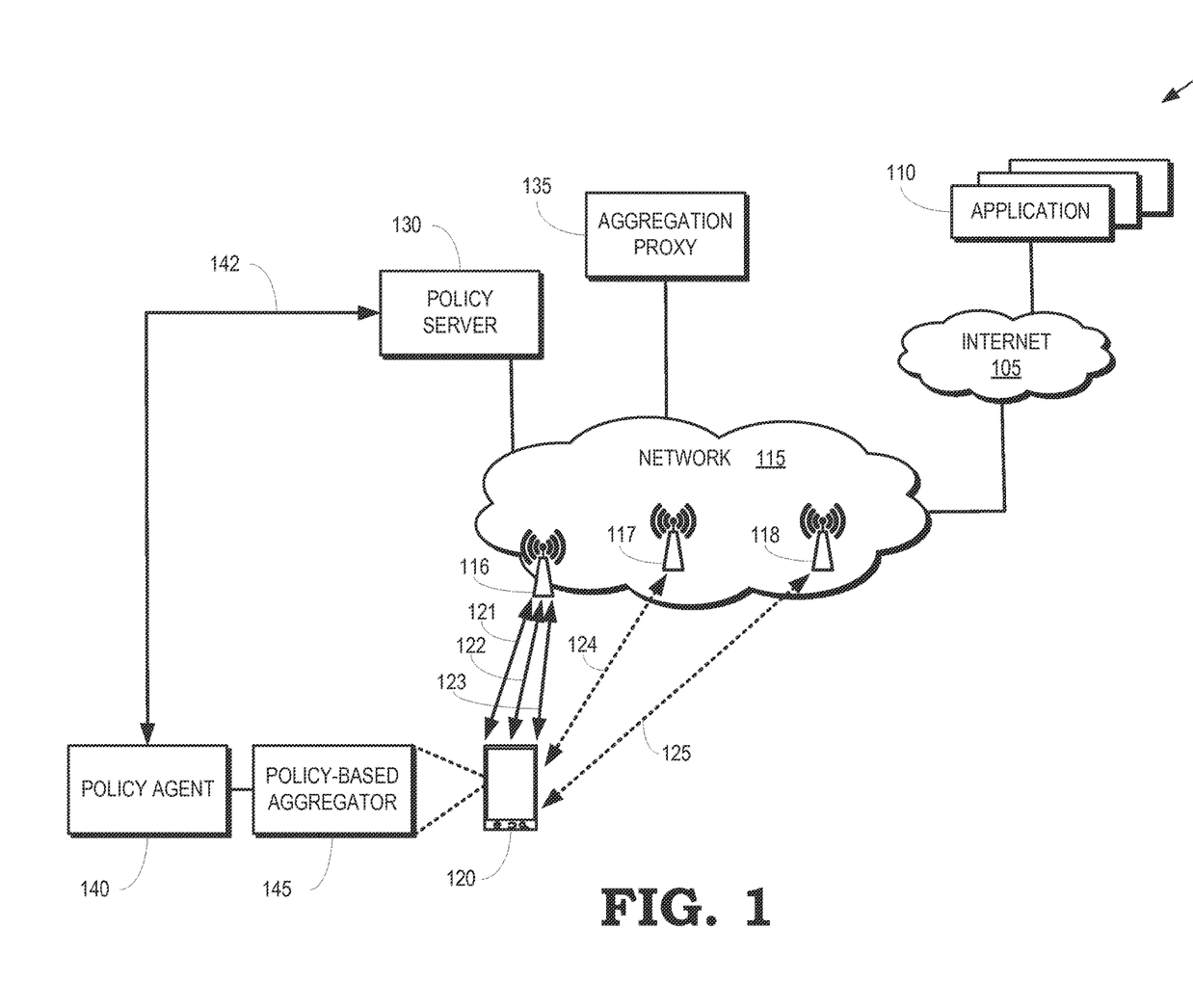
FIG. 1 is a block diagram of a wireless communication system according to some embodiments.

FIG. 1 is a block diagram of a wireless communication system 100 according to some embodiments. The wireless communication system 100 includes a network such as an Internet 105 that is used to convey signals associated with one or more applications 110. Examples of applications 110 that may use the Internet 105 to transmit or receive signals include Netflix, Hulu, Vudu, YouTube, and other multimedia streaming applications. The Internet 105 is connected to a network 115 of base stations 116, 117, 118 (collectively referred to herein as "the base stations 116-118") that provide wireless connectivity to corresponding geographic areas. The base stations 116-118 may also be referred to using terms such as base station router, access point, cell, macrocell, metrocell, small cell, femtocell, picocell, and the like depending on the size or capabilities of the base stations 116-118. For example, the base stations 116-118 may be small cells that are part of a small cell network 115 and provide wireless coverage within a geographic area characterized by a distance of a few tens of meters.

The base stations 116-118 can provide wireless connectivity to user equipment 120 over one or more wireless communication links 121, 122, 123, 124, 125, which are collectively referred to herein as "the links 121-125." The user equipment 120 supports a plurality of interfaces (not shown in FIG. 1) that operate according to different radio access technologies or in different frequency bands. Some embodiments of the user equipment 120 implement three interfaces that may be used to communicate with one or more of the base stations 116-118. For example, the user equipment 120 may use the three interfaces to communicate with the base station 116 over the wireless communication links 121-123. For another example, the user equipment may use the three interfaces to communicate with the base station 116 over the wireless communication link 121, the base station 117 over the wireless communication link 124, and the base station 118 over the wireless communication link 125. The interfaces may include one or more cellular interfaces capable of operation in 3G bands according to code division multiple access (CDMA, W-CDMA) protocols or 4G bands according to FDD or TDD protocols defined by the LTE standards defined by 3GPP. The interfaces may also include one or more Wi-Fi interfaces capable of operation in 2.4 GHz unlicensed bands or 5 GHz unlicensed bands according to the 802.11 standards defined by the IEEE. The user equipment 120 may aggregate one or more of the links 121-125, e.g., to increase the bandwidth available to one or more flows associated with the applications 110. For example, the user equipment 120 may aggregate the interfaces associated with the wireless communication links 121-123 to support sub-flows of a single flow associated with the base station 116. For another example, the user equipment 120 may aggregate the interfaces associated with the wireless communication links 121, 124, 125 to the base stations 116-118.

The wireless communication system 100 includes a policy server 130 that is used to select a subset of interfaces or the corresponding links 121-125 that may be aggregated by the user equipment 120. The policy server 130 may be implemented as a network-resident server (e.g., the policy server 130 is resident in the wireless communication system 100) that manages the base stations 116-118 in the network 115, as well as the user equipment 120 and any other user equipment in the wireless communication system 100. The policy server 130 manages these entities based upon policies associated with the applications 110 or the user equipment 120, e.g., to achieve target objectives such as maximum system capacity, best user experience for predetermined user classes or application classes, monetization of the provision of increased capacity, and the like. The set of base stations 116-118 and user equipment 120 that are managed by the policy server 130 may be referred to as the "aggregation scope" of the policy server 130.

Some embodiments of the policy server 130 receive information identifying one or more interfaces supported by the user equipment 120 and channel capacities of the interfaces supported by the user equipment 120. For example, the user equipment 120 may provide a registration message to the policy server 130 that includes information indicating the channel capacities of the wireless communication links 121-125 associated with the interfaces in the user equipment 120. The policy server 130 may also receive information identifying the channel capacities of interfaces supported by other user equipment in the wireless communication system 100. The policy server 130 may use the information received from the user equipment 120 and (if available) information received from other user equipment to select a subset of the interfaces or the corresponding links 121-125 for aggregation by the user equipment 120. Signals indicating the selected subset may then be provided to the user equipment 120, which may be configured to aggregate the interfaces in the subset.

Each interface supported by the user equipment 120 corresponds to one or more different paths from the user equipment 120 to one of the base stations 116-118. The policy server 130 may select a subset of the interfaces (or links) corresponding to paths with similar characteristics to achieve high aggregation efficiency. Multipath aggregation performs particularly well when the component paths have similar delay characteristics and may not perform as well if the relative delays between signals transmitted on the different component paths exceeds a threshold. For example, the delay characteristics of a network path over an LTE connection to a large macro-cell (not shown in FIG. 1) may be very different than the delay characteristics of a Wi-Fi connection to a nearby small cell. The link delay on the LTE path may be an order of magnitude longer than the link delay on the Wi-Fi path.

Some embodiments of the policy server 130 may therefore implement policies that eliminate or reduce aggregation of interfaces associated with paths having different delay characteristics. For example, the policy server 130 may implement a policy that permits aggregation only in a small cell environment over a cluster of small cells in a well-defined small region, such as the base stations 116-118 in the network 115. Implementing this type of policy limits delay diversity across paths. For another example, the policy server 130 may implement a policy that permits aggregation of interfaces corresponding to paths having absolute delays (or delays relative to other paths) that are less than a threshold. The policy server 130 may therefore request measurements of delays or latency along the paths associated with interfaces that are candidates for aggregation, which can be performed by the user equipment 120 or the base stations 116-118.

The policy server 130 may also request that the user equipment 120 perform measurements of parameters such as received signal strengths, transmission rates, loss rates, and the like. The user equipment 120 may report this information to the policy server 130, which may use the reported information to drive a computational algorithm—referred to herein as GLobal Optimization of Band Aggregation Levels (GLOBAL)—that determines the subset of interfaces or corresponding links 121-125 that may be aggregated by the user equipment 120. Some embodiments of the policy server 130 may also use other information such as network conditions, a user profile, a payment confirmation, and the like to select a subset of the interfaces or links 121-125. Some embodiments of the policy server 130 may support differential service (e.g., providing different quality of service to different users) by adjusting multipath usage in a way that is sensitive to users' service classes or priorities. Some embodiments of the policy server 130 may also be integrated with a network billing system (not shown in FIG. 1) to tie insertion of policies allowing greater per-user/app capacity with payment to monetize higher grade of service.

Some embodiments of the policy server 130 may implement policies that support integration of LTE and Wi-Fi networks for embodiments of the user equipment 120 that support both radio access technologies. These embodiments of the user equipment 120 may be able to seamlessly switch from LTE networks to Wi-Fi networks when a base station in the Wi-Fi network becomes available and vice versa. The policy server 130 may support seamless roaming across LTE and Wi-Fi networks by implementing an appropriate policy. For example, when the user equipment 120 reports that it can connect to one or more visible LTE and Wi-Fi networks, the policy server 130 can insert a policy in the user equipment 120 to mark one of the network connections as active and another as backup. In the event the user equipment 120 loses the active network connection, the user equipment 120 can change the status of backup connection to active and toggle the current active connection to backup. The policy server 130 may also implement policies that support aggregation of interfaces that operate according to different radio access technology so that traffic can be concurrently sent and aggregated across the different interfaces.

An aggregation proxy server 135 is connected to the policy server 130. The aggregation proxy server 135 is a transparent, network-resident proxy server that partitions a connection between one or more of the applications 110 and the user equipment 120 to support aggregation of the subset of the interfaces or the links 121-125. Some embodiments of the aggregation proxy server 135 provide a single connection for each flow from the applications 110 to the aggregation proxy server 135. For example, the single connection may be a legacy transmission control protocol (TCP) or multipath TCP (MPTCP) connection. The aggregation proxy server 135 also provides a multipath connection from the aggregation proxy server 135 to the user equipment 120 over the aggregated subset of the interfaces or the links 121-125. For example, the multipath connection to the user equipment 120 may include a plurality of MPTCP sub-flows and each MPTCP sub-flow may be used to convey information over one of the interfaces in the subset of the links 121-125.

Some embodiments of the user equipment 120 implement a policy agent 140 that communicates with the policy server 130 over a dedicated bidirectional signaling channel 142. The policy agent 140 may generate registration message that include information identifying the capabilities of the interfaces supported by the user equipment 120, such as the channel capacities of the links 121-125. The policy agent 140 may also generate information indicating values of performance measurements made by the user equipment 120, such as instantaneous or time-averaged values of the measured signal strength, transmission rate, loss rate, and the like. The information generated by the policy agent 140 may then be transmitted over one or more uplink channels of the dedicated bidirectional signaling channel 142. The policy agent 140 may also receive information over one channels of the dedicated bidirectional signaling channel 142. For example, the policy agent 140 may receive information indicating the aggregated subset of the interfaces or the links 121-125 selected by the policy server 130, the applications 110 that are allowed to use the subset, a price or cost for using the subset, a request to perform one or more measurements, and the like.

The user equipment 120 may also implement a policy-based aggregator 145 that is connected to the policy agent 140. Some embodiments of the aggregator 145 translates the policies (e.g., the information identifying the selected subset of the interfaces or the links 121-125) provided by the policy server 130 to control the traffic flows over the multiple interfaces in the subset. For example, the aggregator 145 may implement an application programming interface (API), such as a Netlink socket API, which can be used by the policy agent 140 to signal to a modified MPTCP protocol stack in the user equipment 120 to turn one or more sub-flows on for each active MPTCP connection corresponding to an application, the user, or the user equipment 120. The policy agent 140 may also use the API to turn off one or more sub-flows, e.g., in response to the policy server 130 removing one or more interfaces from the subset that is aggregated by the user equipment 120.

Policy signaling between the policy server 130 and the policy agent 140 over the dedicated bidirectional signaling channel 142 may be performed according to different protocols. Some embodiments of the policy server 130 and the policy agent 140 may communicate using protocols that support a "chat" framework so that the policy server 130 and the policy agent 140 may interact with each other. For example, the chat framework may be used to negotiate payment of fees required for communication over one or more of the links 121-125 prior to allowing information to be exchanged over the corresponding interface. The negotiation may include the policy server 130 transmitting a proposed fee for communication over one or more of the links 121-125 and the policy agent 140 responding with a counter offer or confirmation that the user accepts the proposed fee. The negotiation may iterate until the policy server 130 and the policy agent 140 agree on the proposed fee or the policy agent 140 declines to accept the fee required to aggregate the one or more interfaces or links 121-125. Some embodiments of the policy server 130 are the policy agent 140 may transparently support UDP traffic flows as well IPSEC traffic using a tunneling framework such as vtund in Linux (which supports TCP tunneling) combined with packet filtering.

Components of the wireless communication system 100 may be partitioned into multiple layers that implement different functionality. The Open Systems Interconnection (OSI) model partitions functionality events these in the wireless communication system 100 into seven layers: a physical layer (Layer 1), a data link layer (Layer 2), a network layer (Layer 3), a transport layer (Layer 4), a session layer (Layer 5), a presentation layer (Layer 6), and an application layer (Layer 7). For example, the physical layer (PHY) defines the electrical and physical specifications of the data connection, the protocol to establish and terminate a connection between two nodes over a communication medium, modulation or conversion of digital data into analog signals for transmission over the communication medium, and other functionality related to the physical transmission of signals. The data link layer supports reliability by detecting and potentially correcting transmission errors that occur at the physical layer. The data link layer may be divided into a Media Access Control (MAC) layer and a Logical Link Control (LLC) layer. The network layer provides the functional and procedural means to transfer variable length data sequences between nodes in a network, e.g., by routing the messages through the network using addresses associated with the nodes. The network layer may also support fragmenting data sequences into fragments that can be delivered by different routes. The transport layer provides the functional and procedural means of transferring the variable length data sequences from a source to a destination host via one or more networks while maintaining the quality of service. For example, the transport layer may implement TCP or MPTCP. The transport layer may also support error control and packet retransmission.

Conventional mechanisms for providing higher bandwidth, such as carrier aggregation in LTE or increasing the channel width supported in a Wi-Fi network, are implemented in Layer 1 or Layer 2. Consequently, the conventional mechanisms are dependent on the specifications in standards produced by the 3GPP or the IEEE. In contrast, some embodiments of the policy server 130, the aggregation proxy server 135, the policy agent 140, or the policy-based aggregator 145 may be implemented at Layer 3 or Layer 4. Implementing aggregation of interfaces at Layer 3 or Layer 4 allows bandwidth to be flexibly or dynamically increased or decreased without requiring changes to the standards that govern implementation of baseband technologies at Layer 1 or Layer 2.

Figure 2:
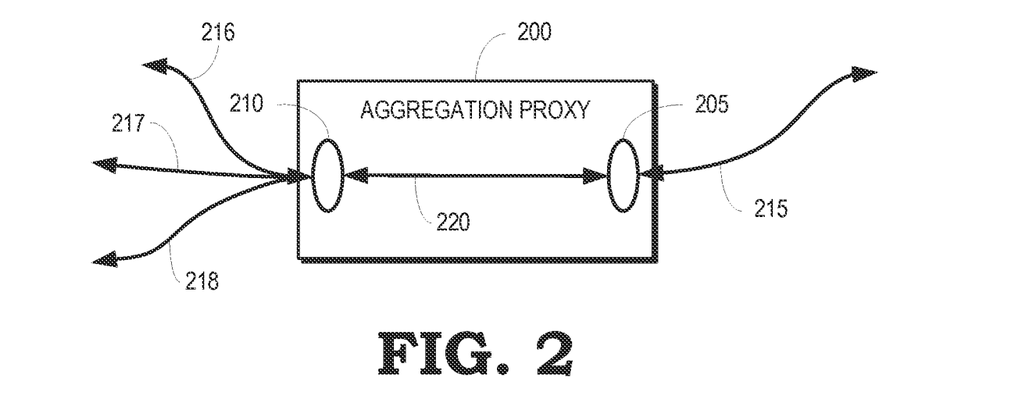
FIG. 2 is a block diagram of an aggregation proxy according to some embodiments.

FIG. 2 is a block diagram of an aggregation proxy 200 according to some embodiments. The aggregation proxy 200 may be implemented in some embodiments of the aggregation proxy server 135 shown in FIG. 1. The aggregation proxy 200 includes a first socket 205, which may be referred to as a server-side socket, and a second socket 210, which may be referred to as a client-side socket. The first socket 205 may be used to establish a connection 215 with an application, such as one of the applications 110 shown in FIG. 1. The connection 215 may be used to support and terminate a flow between the application and the aggregation proxy 200. The second socket 210 may be used to support and terminate a plurality of connections 216, 217, 218 (referred to herein as "the connections 216-218") to support sub-flows between the aggregation proxy 200 and a subset of aggregated interfaces at a client such as the user equipment 120 shown in FIG. 1. The aggregation proxy 200 may therefore copy (as indicated by arrow 220) and partition information received on a downlink portion of the connection 215 into multiple portions, which can then be distributed to the aggregated interfaces using the connections 216-218. The aggregation proxy 200 may also combine information received an uplink portions of the connections 216-218 and provide the combined information to the application using the connection 215.

Some embodiments of the aggregation proxy 200 may be implemented as a transparent split proxy using TCP or MPTCP to configure the socket 205 or the connection 215. The socket 210 or the connections 216-218 may be configured using MPTCP. For example, routing may be configured so that the TCP connection setup procedure for a flow or sub-flow is performed by the aggregation proxy 200 in response to an MPTCP enabled client-side entity or server-side entity enabling a TCP sub-flow. The aggregation proxy 200 may detect the connection attempt using packet filtering mechanisms such as iptables defined in Linux. The aggregation proxy 200 may then configure the client side socket 210 to terminate one or more MPTCP connections (such as the connections 216-218) to the client device and the server-side socket 205 to terminate an independent TCP connection (such as the connection 215) to an internet server/host for the application. Any further sub-flows between the client and the aggregation proxy 200 may be configured at the client-side socket 210 under the control of a policy server such as the policy server 130 shown in FIG. 1. Some embodiments of the aggregation proxy 200 can initiate multiple MPTCP sub-flows under the server-side socket 205 if the internet host supports MPTCP. The policy server may also control one or more sub-flows via the aggregation proxy 200.

Figure 3:
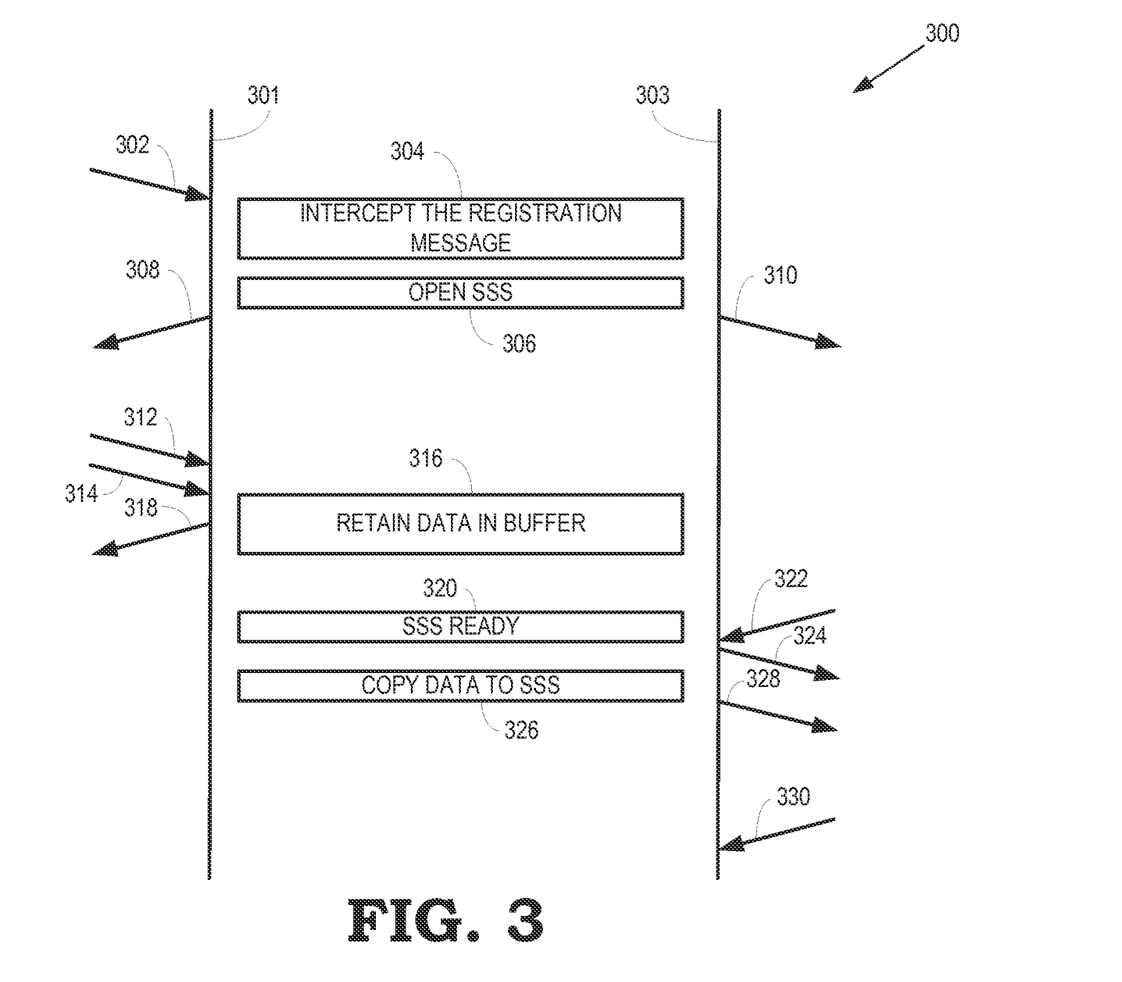
FIG. 3 is a diagram of a method of configuring an aggregation proxy that supports a client-side socket and a server-side socket according to some embodiments.

FIG. 3 is a diagram of a method 300 of configuring an aggregation proxy that supports a client-side socket (CSS) and a server-side socket (SSS) according to some embodiments. The method 300 may be implemented in some embodiments of the aggregation proxy server 135 shown in FIG. 1 or some embodiments of the aggregation proxy 200 shown in FIG. 2. The line 301 indicates the client-side of the aggregation proxy and the line 303 indicates the server-side of the aggregation proxy. At 302, the aggregation proxy receives a registration message at a CSS from a client that includes a synchronization signal for synchronizing the client to an application. The registration message is intercepted (at 304) by the aggregation proxy, e.g., using packet filtering to detect the registration message. In response to intercepting the registration message, the aggregation proxy opens and initiates configuration of a sibling SSS socket at 306. At 308, the aggregation proxy responds to the client with an acknowledgment message indicating successful reception of the registration message. At 310, the aggregation proxy forwards the registration message with the synchronization signal to the server or host of the application indicated in the registration message. The server or host may then use the synchronization signal to synchronize the application and the client for subsequent communication.

At 312, the aggregation proxy receives an acknowledgment message from the client at the CSS and, at 314, the aggregation proxy begins receiving data from the client at the CSS. The data may be addressed to the server that supports the application but at this point configuration of the sibling SSS socket may not be complete. The aggregation proxy may therefore retain the data in a buffer at 316. At 318, the aggregation proxy may transmit an acknowledgment message to the client indicating successful reception of the data. At 320, the aggregation proxy determines that configuration of the sibling SSS socket is complete and the SSS socket is ready to transmit data associated with the flow between the client and the server that supports the application. At 322, the aggregation proxy receives an acknowledgment message indicating that the synchronization signal transmitted at 310 was successfully received by the server. At 324, the aggregation proxy transmits an acknowledgment message indicating successful reception of the technology message from the server. At this point, the CSS and SSS have been configured for the flow and the client is synchronized to the server. The aggregation proxy may therefore copy (at 326) data retained in the buffer to the SSS socket and transmit the copy data to the server at 328. The aggregation proxy may receive an acknowledgment indicating successful reception of the data at 330.

The embodiment of the method 300 illustrated in FIG. 3 depicts configuration of the CSS and SSS sockets of the aggregation proxy in response to detecting a registration message transmitted by the client. The registration message is received at the CSS and triggers configuration of a sibling SSS socket. Other embodiments of the method 300 may be used to configure the CSS and SSS sockets of the aggregation proxy in response to detecting a registration message transmitted by the server that is hosting the application. For example, the aggregation proxy may receive a registration message at an SSS socket and the registration message may trigger configuration of a sibling CSS socket. The aggregation proxy may buffer data received from the client until the CSS socket has been configured and may subsequently copy the data to the CSS socket for transmission to the client over one or more aggregated interfaces, as discussed herein.

Figure 4:
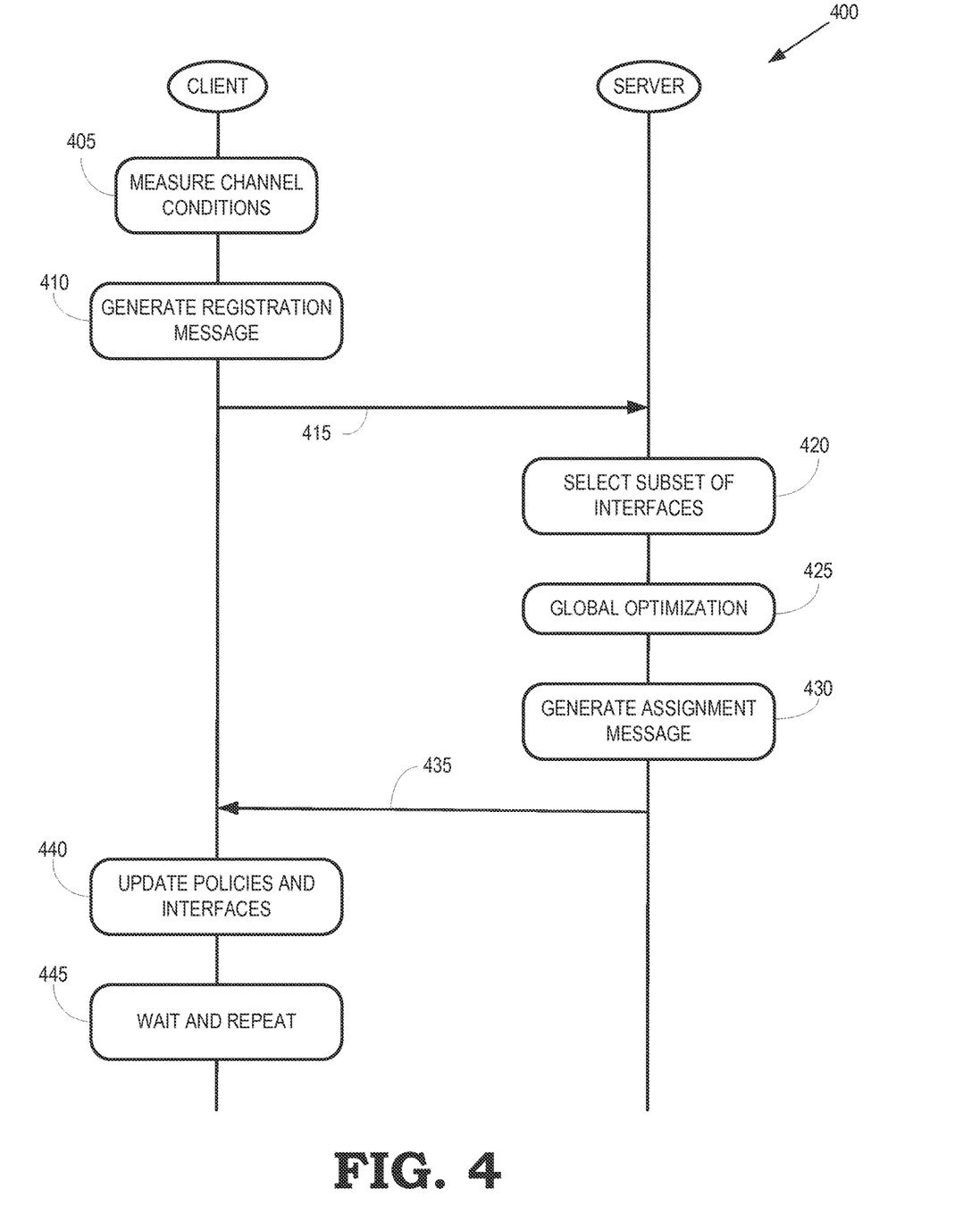
FIG. 4 is a diagram of a method for aggregating interfaces at a client according to some embodiments.

FIG. 4 is a diagram of a method 400 for aggregating interfaces at a client according to some embodiments. The method 400 may be implemented in embodiments of the wireless communication system 100 shown in FIG. 1. At block 405, a client (such as the user equipment 120 shown in FIG. 1) measures channel conditions for channels supported by multiple interfaces in the client. As discussed herein, the interfaces may be implemented using different radio access technologies and may be used to communicate in different frequency bands. The client may use the measured channel conditions to determine channel capacities for each of the interfaces supported by the client. The channel capacities may be indicated by a maximum number of bits per second that can be conveyed over the corresponding channel. At block 410, the client generates a registration message for transmission to a server such as the policy server 130 shown in FIG. 1. Some embodiments of the registration message may be used to register the client for a flow provided by an application such as the applications 110 shown in FIG. 1. The registration message includes information identifying the client, the interfaces, and the channel capacities of the interfaces. For example, the registration message may be in the format:

REGISTER device C0:3F:D5:66:6A with:
BSSID 08:86:3B:51:98:F8, rate 300 Mbps
BSSID 08:86:3B:51:98:1A, rate 300 Mbps
BSSID 08:86:3B:D7:7E:AC, rate 65 Mbps The registration message may therefore identify the client device and three interfaces having channel capacities of 300 Mbps, 300 Mbps, and 65 Mbps, respectively. The client transmits the registration message to the server at 415. Although not illustrated in FIG. 4, other clients within the aggregation scope of the server may also transmit registration messages, which may be used to select the subsets of interfaces that are aggregated at the different clients.

At block 420, the server selects a subset of the interfaces indicated in the registration message. For example, the server may select a subset of the interfaces based on delay characteristics associated with the interfaces. At block 425, the server performs a global optimization of the selected subset of the interfaces for the client and any other clients that are also in the aggregation scope of the server. Some embodiments of the server implement a global optimization algorithm that attempts to maximize the total capacity obtained by all users or clients (which may also be referred to as the aggregate network capacity) in a proportional fair sense when accounting for user priorities. For example, the global optimization problem may be formulated as:

$$\max \sum_{i \in all\ users} \gamma_i \log t_i$$

$$t_i = \sum_{j \in links} C_{ij} a_{ij}$$

The priorities of user i is given by $\gamma_i$ and $a_{ij}=1$ if the user i has been given access to link/to the corresponding interface, otherwise $a_{ij}=0$. The capacity available to the user i on link j is represented by $C_{ij}$. The capacity may be a function of channel condition, other users sharing the channel, the channel access model (e.g., Wi-Fi versus scheduled access in LTE), or other parameters or characteristics. The global optimization problem is NP-complete and is therefore computationally intractable for large networks. Some embodiments of the policy server may therefore solve the global optimization problem using heuristic techniques such as hill climbing or simulated annealing.

Once the global optimization problem has been solved to select a final subset of the interfaces to be aggregated by the client (and any other clients within the aggregation scope of the server), the server generates (at block 430) an assignment message that include information identifying the aggregated interfaces. For example, the assignment message may be in the format:

ASSIGNMENT
08:86:3B:51:98:F8
08:86:3B:51:98:1A

The assignment message may therefore identify two interfaces that may be aggregated by the client. The server transmits the assignment message to the client at 435. At block 440, the client updates the policies that are used to configure its interfaces. For example, the client may configure the interfaces indicated in the assignment message for aggregation. At block 445, the client waits for any subsequent updates. Some embodiments of the client may also repeat the method 400, e.g., in response to initiation of a new flow or in response to a request from the server to update measurements of the channel conditions or perform other measurements.

Figure 5:
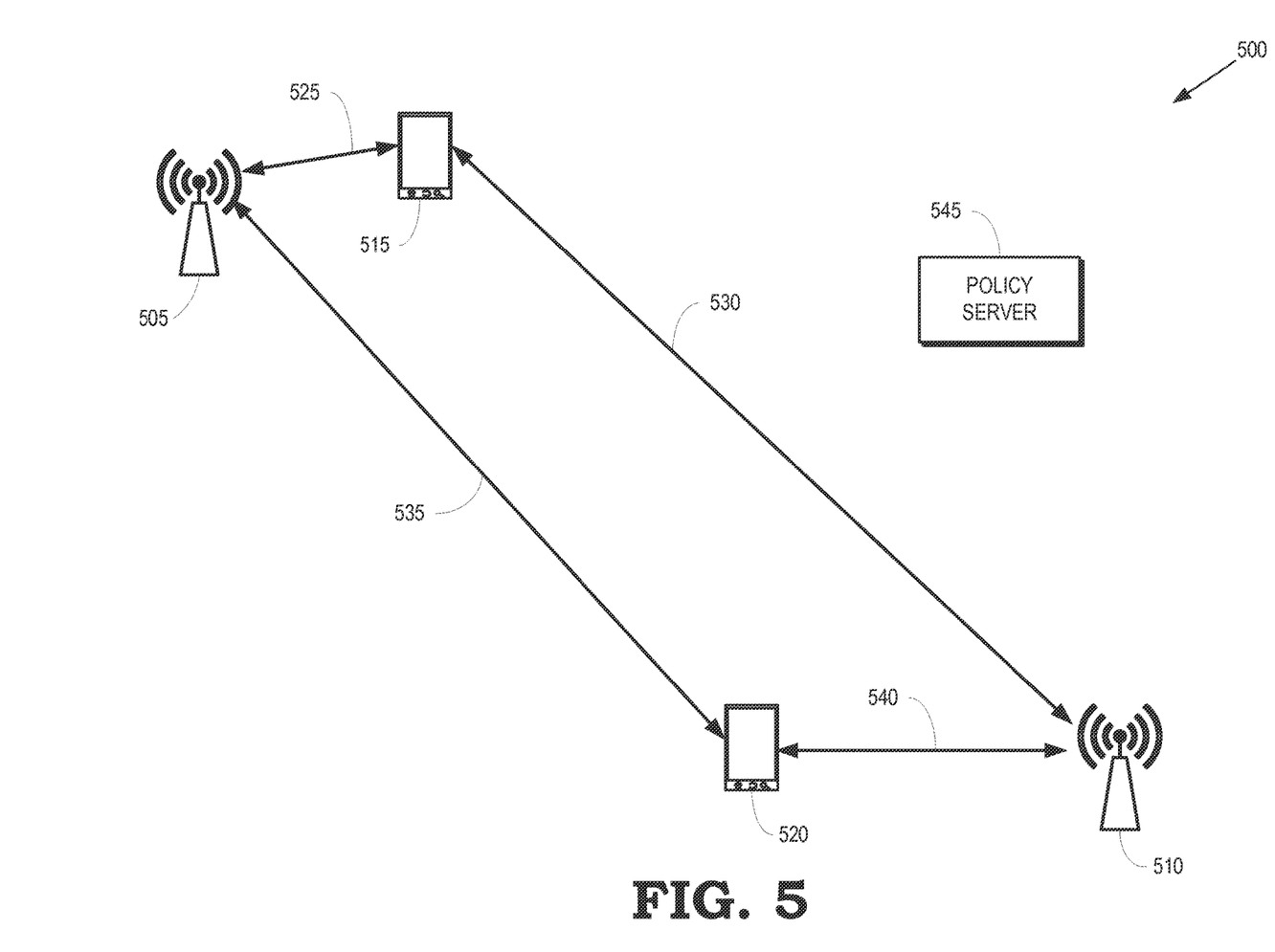
FIG. 5 is a diagram of a wireless communication system according to some embodiments.

FIG. 5 is a diagram of a wireless communication system 500 according to some embodiments. The wireless communication system 500 includes base stations 505, 510 that can provide wireless connectivity to user equipment 515, 520. The user equipment 515, 520 support multiple interfaces to communicate with the different base stations 505, 510. For example, the user equipment 515 includes interfaces for communicating with the base station 505 over wireless communication link 525 and communicating with the base station 510 over the wireless communication link 530. For another example, the user equipment 520 includes interfaces for communicating with the base station 505 over the wireless communication link 535 and communicating with the base station 510 over the wireless communication link 540. At least in part because of the relative proximities of the base stations 505, 510 and the user equipment 515, 520, the channel capacities are different for the wireless communication links 525, 530, 535, 540. For example, interfaces for the wireless communication links 525, 540 may support communication at a channel capacity of 54 Mbps and interfaces for the wireless communication links 530, 535 may only support communication at a channel capacity of 6 Mbps.

A policy server 545 may be used to coordinate aggregation of interfaces by the user equipment 515, 520 to improve the overall throughput. For example, allowing the user equipment 515 to aggregate interfaces for the wireless communication links 525, 530 would likely reduce the overall throughput for the user equipment 515 because the channel capacity of the wireless communication link 530 is nearly an order of magnitude lower than the channel capacity of the wireless communication link 525. Allowing the user equipment 520 to aggregate interfaces for the wireless communication links 535, 540 would similarly reduce the overall throughput for the user equipment 520. Some embodiments of the policy server 545 may therefore globally optimize throughput by instructing the user equipment 515 to only aggregate interfaces for the wireless communication link 525 to the base station 505 and instructing the user equipment 520 to only aggregate interfaces for the wireless communication link 540 to the base station 510.

Figure 6:
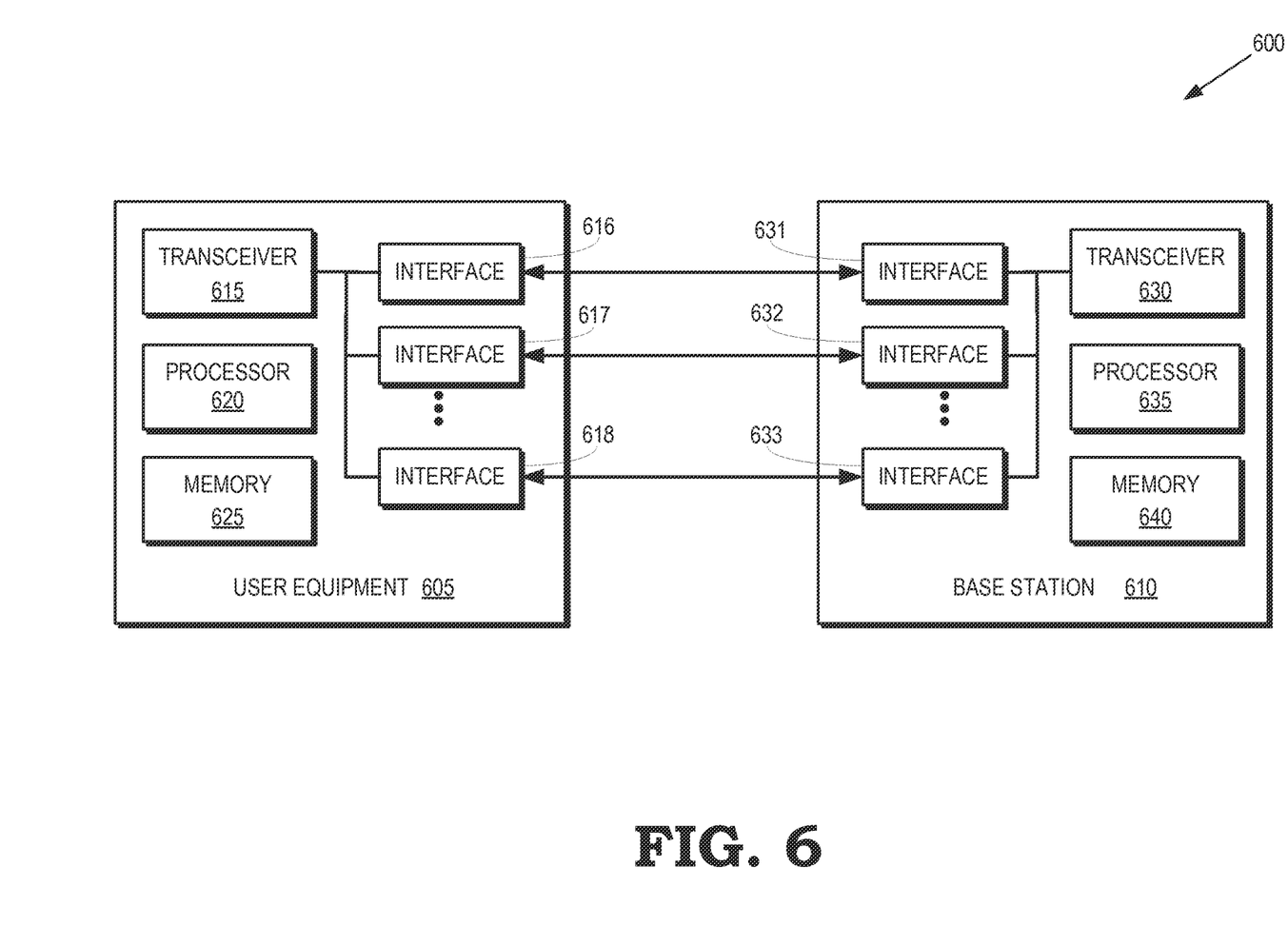
FIG. 6 is a block diagram of a wireless communication system according to some embodiments.

FIG. 6 is a block diagram of a wireless communication system 600 according to some embodiments. The wireless communication system 600 includes user equipment 605 and a base station 610, which may be used to implement some embodiments of the user equipment 120 or one or more of the base stations 116-118 shown in FIG. 1.

The user equipment 605 includes a transceiver 615 for transmitting and receiving signals over one or more interfaces 616, 617, 618, which may referred to herein as "the interfaces 616-618." The interfaces 616-618 may be used to support wireless communication according to one or more radio access technologies and in one or more licensed or unlicensed frequency bands. The user equipment 605 also includes a processor 620 and a memory 625. The processor 620 may be used to execute instructions stored in the memory 625 and to store information in the memory 625 such as the results of the executed instructions. Some embodiments of the transceiver 615, the interfaces 616-618, the processor 620, or the memory 625 may be configured to perform portions of the method 300 shown in FIG. 3 or the method 400 shown in FIG. 4.

The base station 610 includes a transceiver 630 for transmitting and receiving signals over one or more interfaces 631, 632, 633, which may referred to herein as "the interfaces 631-633." The interfaces 631-633 may be used to support wireless communication according to one or more radio access technologies and in one or more licensed or unlicensed frequency bands. The base station 610 also includes a processor 635 and a memory 640. The processor 635 may be used to execute instructions stored in the memory 640 and to store information in the memory 640 such as the results of the executed instructions. Some embodiments of the transceiver 630, the interfaces 631-633, the processor 635, or the memory 640 may be configured to perform portions of the method 300 shown in FIG. 3 or the method 400 shown in FIG. 4.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
transmitting, from first user equipment, information identifying first interfaces supported by the first user equipment and first channel capacities associated with the first interfaces;
receiving, at the first user equipment, information identifying a subset of the first interfaces, wherein the subset is selected based on the first channel capacities and second channel capacities of second interfaces associated with at least one second user equipment; and
configuring the first user equipment to aggregate the subset of the first interfaces.

2. The method of claim 1, further comprising:
transmitting information identifying delays associated with the first interfaces, and wherein receiving the information identifying the subset comprises receiving information identifying a subset selected based on the delays.

3. The method of claim 1, wherein transmitting the information identifying the first interfaces and receiving the information identifying the subset comprises transmitting the information identifying the first interfaces on an uplink of a dedicated bidirectional signaling channel and receiving the information identifying the subset on a downlink of the dedicated bidirectional signaling channel.

4. The method of claim 1, further comprising:
measuring at least one value of a signal strength, a transmission rate, and a loss rate; and
transmitting information identifying the at least one value, and wherein receiving the information identifying the subset comprises receiving information identifying a subset selected based on the at least one value.

5. The method of claim 1, further comprising:
negotiating payment for usage of the subset of the first interfaces in response to receiving the information identifying the subset; and
transmitting or receiving information via the subset in response to negotiating the payment.

6. A method comprising:
receiving, at a policy server, a first registration message including information from a first user equipment identifying first interfaces supported by the first user equipment and first channel capacities of the first interfaces;
selecting, at the policy server, a subset of the first interfaces supported by the first user equipment based on the first channel capacities of the first interfaces and second channel capacities of second interfaces associated with at least one second user equipment; and
transmitting, from the policy server to the first user equipment, instructions to aggregate the subset.

7. The method of claim 6, further comprising:
receiving, at the policy server, at least one second registration message including information from the at least one second user equipment identifying the second interfaces and the second channel capacities.

8. The method of claim 7, wherein receiving the first registration message including the information identifying the first interfaces and transmitting the instructions comprises receiving the first registration message including the information identifying the first interfaces on an uplink of a dedicated bidirectional signaling channel and transmitting the instructions on a downlink of the dedicated bidirectional signaling channel.

9. The method of claim 6, further comprising:
receiving information identifying delays associated with the first interfaces, and wherein selecting the subset comprises selecting the subset based on the delays.

10. A method comprising:
transmitting, from first user equipment, information identifying first interfaces supported by the first user equipment and first channel capacities associated with the first interfaces;
receiving, at the first user equipment, information identifying a subset of the first interfaces, wherein the subset is selected based on the first channel capacities and second channel capacities of second interfaces associated with at least one second user equipment, wherein selecting the subset comprises selecting the subset to optimize at least one of an aggregate network capacity and a differential service to the first user equipment and the at least one second user equipment; and
configuring the first user equipment to aggregate the subset of the first interfaces.

11. The method of claim 6, further comprising:
transmitting a request to measure at least one value of a signal strength, a transmission rate, and a loss rate; and
receiving information identifying the at least one value, and wherein selecting the subset comprises selecting the subset based on the at least one value.

12. The method of claim 6, further comprising:
negotiating payment for usage of the subset of the first interfaces in response to receiving the information identifying the subset.

13. A method comprising:
transmitting, from first user equipment, information identifying first interfaces supported by the first user equipment and first channel capacities associated with the first interfaces;
receiving, at the first user equipment, information identifying a subset of the first interfaces, wherein the subset is selected based on the first channel capacities and second channel capacities of second interfaces associated with at least one second user equipment;
configuring the first user equipment to aggregate the subset of the first interfaces;
opening a first socket to terminate first connections to the subset of the first interfaces; and
opening a second socket to terminate a second connection to a server, wherein the first socket and the second socket are opened in response to receiving the information identifying the first interfaces and the first channel capacities.

14. The method of claim 13, further comprising:
providing data received from the server at the second socket to the subset of the first interfaces via the first socket.

15. User equipment comprising:
a plurality of first interfaces;
a transceiver to transmit information identifying the first interfaces and first channel capacities associated with the first interfaces and receive information identifying a subset of the first interfaces, wherein the subset is selected based on the first channel capacities and second channel capacities of second interfaces associated with at least one other user equipment; and
a processor to aggregate the subset of the first interfaces.

16. The user equipment of claim 15, wherein the transceiver is to transmit information identifying delays associated with the first interfaces and receive information identifying a subset selected based on the delays.

17. The user equipment of claim 15, wherein the transceiver is to transmit the information identifying the first interfaces on an uplink of a dedicated bidirectional signaling channel and receive the information identifying the subset on a downlink of the dedicated bidirectional signaling channel.

18. The user equipment of claim 15, wherein the processor is to measure at least one value of a signal strength, a transmission rate, and a loss rate, and wherein the transceiver is to transmit information identifying the at least one value and receive information identifying a subset selected based on the at least one value.

19. The user equipment of claim 15, wherein the processor is to negotiate payment for usage of the subset of the first interfaces in response to receiving the information identifying the subset, and wherein the transceiver is to transmit or receive information via the subset in response to negotiating the payment.

20. An apparatus comprising:
a transceiver to receive a first registration message including information identifying first interfaces supported by a first user equipment and first channel capacities of the first interfaces;
a processor to select a subset of the first interfaces supported by the first user equipment based on the information indicating first channel capacities of the first interfaces and second channel capacities of second interfaces associated with at least one second user equipment, and
wherein the transceiver is to transmit instructions to aggregate the subset at the first user equipment.

21. The apparatus of claim 20, wherein the transceiver is to receive at least one second registration message including information from the at least one second user equipment identifying the second interfaces and the second channel capacities.

22. The apparatus of claim 21, wherein the transceiver is to receive the information identifying the first interfaces on an uplink of a dedicated bidirectional signaling channel, and wherein the transceiver is to transmit the instructions on a downlink of the dedicated bidirectional signaling channel.

23. The apparatus of claim 20, wherein the transceiver is to receive information identifying delays associated with the first interfaces, and wherein the processor is to select the subset based on the delays.

24. An apparatus comprising:
a processor to select a subset of first interfaces supported by a first user equipment based on information indicating first channel capacities of the first interfaces and second channel capacities of second interfaces associated with at least one second user equipment, wherein the processor is to select the subset to optimize at least one of an aggregate network capacity and a differential service to the first user equipment and the at least one second user equipment; and
a transceiver to transmit instructions to aggregate the subset at the first user equipment.

25. The apparatus of claim 20, wherein the transceiver is to transmit a request to measure at least one value of a signal strength, a transmission rate, and a loss rate, and wherein the transceiver is to receive information identifying the at least one value, and wherein the processor is to select the subset based on the at least one value.

26. The apparatus of claim 20, wherein the processor is to negotiate payment for usage of the subset of the first interfaces in response to receiving the information identifying the sub set.

27. An apparatus comprising:
- a processor to select a subset of first interfaces supported by a first user equipment based on information indicating first channel capacities of the first interfaces and second channel capacities of second interfaces associated with at least one second user equipment, wherein the processor is to open a first socket to terminate first connections to the subset of the first interfaces, and wherein the processor is to open a second socket to terminate a second connection to a server, wherein the processor is to open the first socket and the second socket in response to receiving the information identifying the first interfaces and the first channel capacities; and
- a transceiver to transmit instructions to aggregate the subset at the first user equipment.

28. The apparatus of claim 27, wherein the processor is to provide data received from the server at the second socket to the subset of the first interfaces via the first socket.

* * * * *